(12) United States Patent
Rüb et al.

(10) Patent No.: US 9,381,542 B2
(45) Date of Patent: Jul. 5, 2016

(54) METHODS FOR APPLYING A FOAMABLE REACTION MIXTURE, HIGH PRESSURE DEVICE AND DEVICE FOR PRODUCING SANDWICH COMPOSITE ELEMENTS

(71) Applicant: Bayer MaterialScience AG, Leverkusen (DE)

(72) Inventors: Thomas Rüb, Leverkusen (DE); Uwe Kuenzel, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 60 days.

(21) Appl. No.: 14/457,700

(22) Filed: Aug. 12, 2014

(65) Prior Publication Data
US 2015/0140313 A1    May 21, 2015

Related U.S. Application Data

(62) Division of application No. 13/147,638, filed as application No. PCT/EP2010/000461 on Jan. 27, 2010, now Pat. No. 8,833,297.

(51) Int. Cl.
*B32B 37/12* (2006.01)
*B05D 1/34* (2006.01)
*B29C 44/34* (2006.01)
(Continued)

(52) U.S. Cl.
CPC ............. *B05D 1/34* (2013.01); *B29C 44/3442* (2013.01); *B29C 44/467* (2013.01); *B32B 5/022* (2013.01); *B32B 5/18* (2013.01); *B32B 5/20* (2013.01); *B32B 5/245* (2013.01); *B32B 15/046* (2013.01); *B32B 15/18* (2013.01); *B32B 15/20* (2013.01); *B32B 27/065* (2013.01); *B32B 27/304* (2013.01); *B32B 27/36* (2013.01); *B32B 29/007* (2013.01); *B32B 2262/101* (2013.01); *B32B 2266/0278* (2013.01); *B32B 2307/302* (2013.01);
(Continued)

(58) Field of Classification Search
None
See application file for complete search history.

(56) References Cited

U.S. PATENT DOCUMENTS 8,075,302 B1 * 12/2011 McClellan ............... B29B 7/325
  366/159.1
8,828,495 B2 * 9/2014 Ogonowski ............. B05B 1/042
  118/300

(Continued)

FOREIGN PATENT DOCUMENTS

DE    1609668 A1    3/1972
GB    1160891       8/1969
WO    03064236 A1   8/2003

*Primary Examiner* — Joseph Miller, Jr.
(74) *Attorney, Agent, or Firm* — Donald R. Palladino; Robert S. Klemz

(57) ABSTRACT

The invention relates to a high-pressure device for application of an expandable reaction mixture on a surface, to a method for producing expandable foams, to a device for producing sandwich composite elements, and to a method for producing expanded sandwich composite elements. The high-pressure device includes a mixing head, a distributor head fluidically connected downstream of the mixing head, at least three outlet lines attached to the distributor head, a high-pressure feed line of a component A to the mixing head, a high pressure feed line of a component B to the mixing head, at least one static mixer for mixing an inert gas to the component A, the component B or a mixture of components A and B, at least one high-pressure feed line for the inert gas, which is under increased pressure, and at least one measurement and control unit for the desired pressure of the components on the mixing head.

15 Claims, 2 Drawing Sheets

(51) Int. Cl.
*B29C 44/46* (2006.01)
*B32B 5/02* (2006.01)
*B32B 5/18* (2006.01)
*B32B 5/20* (2006.01)
*B32B 5/24* (2006.01)
*B32B 15/04* (2006.01)
*B32B 15/18* (2006.01)
*B32B 15/20* (2006.01)
*B32B 27/06* (2006.01)
*B32B 27/30* (2006.01)
*B32B 27/36* (2006.01)
*B32B 29/00* (2006.01)

(52) U.S. Cl.
CPC ............... *B32B 2307/3065* (2013.01); *Y10T 428/249953* (2015.04)

(56) References Cited

U.S. PATENT DOCUMENTS

2007/0267443 A1 11/2007 Rub et al.
2011/0147975 A1* 6/2011 Fujio .................. B29C 44/3446
264/50

* cited by examiner

METHODS FOR APPLYING A FOAMABLE REACTION MIXTURE, HIGH PRESSURE DEVICE AND DEVICE FOR PRODUCING SANDWICH COMPOSITE ELEMENTS

CROSS REFERENCE TO RELATED APPLICATIONS

This application is a Divisional application of U.S. Ser. No. 13/147,638, filed Aug. 3, 2011, now U.S. Pat. No. 8,833,297 B2, which is incorporated herein by reference.

BACKGROUND

The invention relates to a high pressure device for the optionally simultaneous and optionally uniform application of a foamable reaction mixture onto a surface, to a method for producing foamable reaction mixtures, to a device for producing sandwich composite elements and to a method for producing foamed sandwich composite elements.

For the purposes of the present invention, a high pressure feed line should be taken to mean that zone of the feed line which connects the final pump to the mixing head. For the purposes of the present invention, the final pump is designated the high pressure metering pump. The admission pressure feed line should be taken to mean that zone of the feed line which is located flow-wise upstream of the high pressure metering pump.

For the purposes of the present invention, the admission pressure side should be taken to mean that side which is located flow-wise upstream of the high pressure metering pump while the high pressure side should be taken to mean that side which is located flow-wise downstream of the high pressure metering pump.

For the purposes of the present invention, the service life should be taken to mean that period of time during which a foamable reaction mixture may be produced with the device without requiring cleaning of the application system (i.e. distributor head and hoses).

There has long been a requirement for devices for the continuous production of sandwich composite elements in which the production speed can be raised to speeds of more than 15 m/min, in particular of more than 40 m/min, still more preferably of more than 60 m/min.

Oscillating mixing heads have hitherto been known from the prior art for the continuous production of sandwich composite elements. The mixing head here performs an oscillating movement over the width of a lower facing and applies the still liquid reaction mixture onto the lower facing by means of a casting rake or tongue/spoon nozzle, which is arranged at right angles to the mixing head and parallel to the lower facing. The mixing head is fastened to a guide rail or "gantry" over the lower facing and, with the assistance of electric motors, is accelerated and braked before the reversal points. The foaming raw materials are supplied to the mixing head via hose lines. In some cases, hydraulic or pneumatic hoses also lead to the mixing head. The foaming raw materials are introduced into the mixing head via nozzles and mixed. The reaction mixture then flows into the casting rake and emerges from the regularly arranged bores. The length of the casting rake and its bores together with the oscillating movement of the mixing head ensure a uniform distribution, lying obliquely to the conveying direction, of the reaction mixture. After application, the reaction mixture foams and rises up to the upper facing. During the foaming process, it adhesively bonds the two facings, before the foam solidifies and cures.

This production method is limited with regard to manufacturing technology in terms of production speed. Even if sufficiently strong motors, guide rails, hoses, mixing heads and casting rakes or tongue/spoon nozzles were to be used, the reaction mixture would be projected beyond the edges of the facings due to excessive centrifugal forces prevailing at the reversal points. According to the prior art, it is not possible using this application method to achieve production speeds of above 15 m/min in the continuous production of sandwich composite elements.

It is sufficiently well known to increase production speed to 60 m/min by using the method involving stationary mixing head technology and rigid outlet systems. This method is known as US technology. This US technology (high-speed machine) substantially consists of three identical dispensing lines with separate feed and separate mixing heads and outlet systems. This technology does not, however, comprise just one distributor head, but disadvantageously requires a plurality of distributor heads. This method furthermore has the disadvantage that the reaction mixture emerging in each case from the individual mixing heads may also be under different physical conditions in terms of pressure and temperature, which may be manifested in the respective resultant foam by impaired quality features such as for example uneven surface, smaller cells, different thermal conductivity values due to local variations in reaction kinetics.

EP 1 857 248 A2 solves this problem by each outlet line not having a separate mixing head. Instead only one mixing head is provided, from which a plurality of outlet lines are supplied. The system described in EP 1 857 248 A2 comprises devices which operate at pressures which are conventional for producing PU foams, in which a pressure of 6 bar is not exceeded; such devices permit production speeds of 15 to at most 60 m/min.

WO 03/064236 A1 addresses the problem of controlling the foam cell count within broad limits and of establishing the size distribution of the cells in the foam and discloses a method for producing polyurethane foam by mixing an isocyanate component with a polyol component in a mixing unit in the presence of a dissolved foaming agent and air and/or nitrogen as bubble nucleating agent, the bubble nucleating agent proceeding by fine dispersion and pressure elevation on the low pressure side.

Against the background of this prior art, the object of the present invention was to develop devices or methods with which production speed can be further increased. A further object was also to improve the surface (above all with regard to its uniformity) of the foams obtainable with such devices/methods together with the above-defined product qualities. A further object of the present invention was to ensure that the application system (i.e. the distribution head and the hoses) has a longer service life than the method known from EP 1 857 248 A2.

SUMMARY

This object is achieved in a first embodiment by a device for applying foamable reaction mixtures comprising
  a mixing head,
  a distributor head located flow-wise downstream of the mixing head,
  at least three outlet lines fitted to the distributor head, which are fitted flow-wise downstream of the distributor head,
  a high pressure feed line for a component A to the mixing head,
  a high pressure feed line for a component B to the mixing head, at least one static mixer for intermixing an inert gas and component A, component B or a mixture of components A and B, at least one high pressure feed line for the inert gas under elevated pressure and at least one measurement and control unit for establishing the desired pressures of the components at the mixing head.

DETAILED DESCRIPTION

Figure 1:
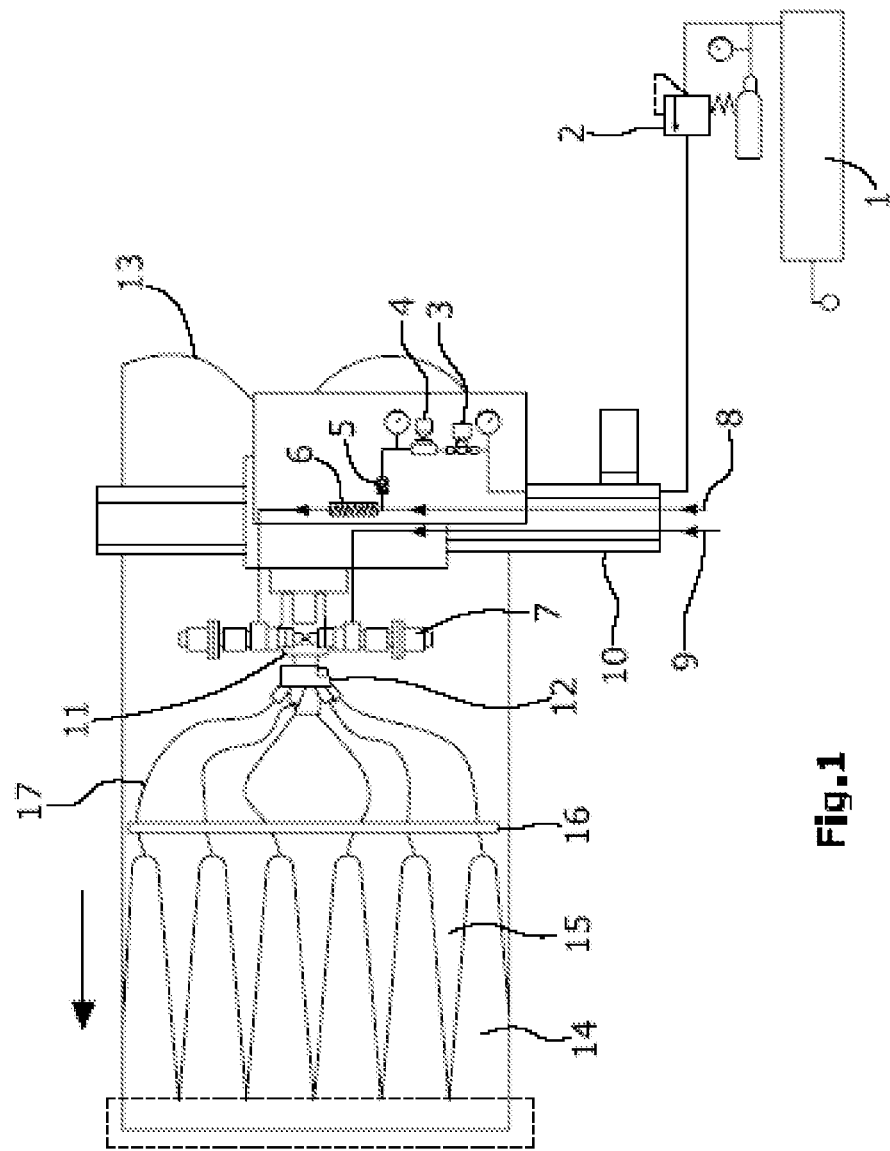
FIG. 1 is a schematic illustration of an application device according to an embodiment of the present invention.

When the distributor head is described in this context as being located downstream of the mixing head, this should be understood as being in relation to the direction of flow of the material flowing through these two heads, the material accordingly flowing firstly through the mixing head and only then through the distributor head.

The methods stated below are known from the prior art for metering a gas into the stream of polyol: an admission pressure is generated in the storage tank by means of a pump (for example a screw pump or gear pump), this pressure generally being between three and eight bar (max. 10 bar). It is possible to carry out gas charging on the admission pressure side. To this end, the gas charging unit is fitted in the admission pressure side where it mixes the gas in defined manner into the polyol by means of a fast-running hollow stirrer. In normal production, the gas content is no greater than 1 NL/min (normal liter per minute; a normal liter is the volume which is occupied by a gas at a pressure $p_n$ of 1.01325 bar, atmospheric humidity of 0% (dry gas) and a temperature $T_n$ of 237.15 K) and has no effect on the accuracy of the metering pump. A drawback is that, at a higher gas content, cavitation may occur in the metering pump. This results in the metering pump metering inaccurately and wear being very much more severe. It is also possible to effect gas charging on the admission pressure side with a pressurisation pump. This prevents cavitation by a pressurisation pump, which increases the admission pressure to up to 30 bar, being installed between the gas charging unit and metering pump. In these devices, the total volume from the gas charging point to the mixing head is generally 20-30 $dm^3$. The service life in such a prior art device without gas charging or with gas charging on the low pressure side is less than one hour when producing foamable reaction mixtures.

In the device according to the present invention, the gas is metered in (for example in a static mixer) on the high pressure side. This has the advantage that, at the onset of foaming, the gas is present earlier (generally about 10× faster) in the application system (i.e. in the emerging foaming reaction mixture and in the hoses) in comparison with the previously described method known from the prior art with gas charging on the admission pressure side. The total volume from the static mixer to the mixing head of the device according to the invention is preferably less than 2.0 $dm^3$. This has the surprising advantage that the hoses do not become blocked during the foaming process. It is particularly advantageous for the high pressure side to be operated at pressure of 150 to 250 bar and for the gas to be compressed (for example by means of a compressor) upstream of the static mixer to a pressure which is at least 5 bar above the pressure of the high pressure side.

By using the device according to the invention in which the gas is introduced on the high pressure side, the application system (distributor head and hoses) advantageously has a service life when producing foamable reaction mixtures of at least eight hours without cleaning being required. As has already been mentioned above, the service life in a corresponding prior art device without gas charging or with gas charging on the low pressure side in the production of foamable reactions under otherwise identical conditions is only less than one hour. Further advantages of the device and of the method according to the present invention are that no material need be discarded at the start of the method, since gas charging is achieved in the immediate vicinity of the application points.

The inert gas is advantageously selected from the group of air, nitrogen, carbon dioxide and noble gases such as argon and helium. Air is preferably used as the chemically inert gas.

The purpose of the static mixer(s) is here to provide intimate mixing of the particular component or mixture with the inert gas under elevated pressure. After introduction of the inert gas, the components on their way to the mixing/distributor head or the mixture of the components on its way to the distributor head (because the inert gas is here introduced either in the mixing head or between the mixing head and distributor head) exhibit(s) an elevated pressure, which brings about an elevated discharge speed of the foamable reaction mixture and so enables an elevated production speed. The increase in discharge speed additionally brings about a more uniform surface on the foam which is to be produced. The above-stated product qualities are furthermore improved.

It is advantageous for the outlet lines of the high pressure device according to the invention to be fastened to a rigid frame transversely of the outflow direction of the foamable reaction mixture. Such fastening is simple and fixation is likewise reproducible for different types of panel. The pressure in the mixing/distributor head here does not correspond to the pressure which is achieved by known prior art devices.

It is advantageous, in the high pressure device according to the invention, for at least one static mixer, in particular a first static mixer for component A and a second static mixer for component B, to be arranged upstream of the mixing head.

Such an arrangement ensures that, on inlet into the mixing head, both components A and B are under elevated pressure, so resulting in more intimate mixing of the two components and thus more homogeneous formation of the foam.

It is advantageous in the high pressure device according to the invention for a static mixer to be arranged downstream of the mixing head.

In this process variant, it is thus only the mixture of the two components A and B, and not for instance already the two components individually, which are placed under elevated pressure. This process variant reduces costs since the corresponding components such as static mixer, measurement and control unit are required only once.

It is advantageous in the high pressure device according to the invention for the inert gas feed line to open in the area of the static mixer into the stream of component A, of component B and/or of the mixture of components A and B entering the static mixer.

This brings about a certain degree of premixing, which is then immediately thereafter completed by the static mixer. If the inert gas entry point is located (spatially) too far from the static mixer, there is a risk of the components/mixture and the inert gas segregating on their way to the static mixer, which would not be able to compensate this sufficiently.

It is advantageous in the high pressure device according to the invention for at least one static mixer and at least one measurement/control means to be fastened to the frame.

The device according to the invention can be designed very compactly thanks to this arrangement.

It is advantageous for the high pressure device according to the invention to comprise a high pressure compressor for compressing the inert gas.

As a consequence, it is not necessary for example to use any metal gas cylinders holding precompressed inert gases, which results in distinct cost savings.

It is advantageous for the high pressure device according to the invention to comprise at least one heat exchanger, in particular a high-pressure heat exchanger, for adjusting the temperature of component A and/or component B. Pressurisation alone would heat the component(s)/mixture too strongly.

It is advantageous for the high pressure device according to the invention to comprise at least 4 outlet lines of identical cross-section fitted to the distributor head which are of identical length and consist of identical material.

The high pressure device according to the invention is advantageous if the outlet lines are positioned in accordance with the panel geometry and the emerging reaction mixture is uniformly distributed over the entire width of a lower facing.

In a second embodiment, the object of the invention is achieved by a method for producing foamable reaction mixtures by using a high pressure device according to the invention.

An isocyanate component is preferably used as component B. A polyol component is preferably used as component A. In this context, the terms "isocyanate component" and "polyol component" also respectively include mixtures of various isocyanates and polyols.

The method is preferably performed such that the inert gas is compressed to a pressure of >150 bar prior to introduction into component A, component B and/or the mixture of components A and B. The gas must here always be at a higher pressure than the component into which it is introduced. A pressure difference of 10 bar between the inert gas and the components is in each case sufficient.

In the method according to the invention, the outlet lines are preferably fastened onto the frame in such a manner that the areas not wetted by the outflowing foamable reaction mixture are identical in size to an area which is to be covered.

In the method according to the invention, the outlet lines are preferably fastened onto the frame in such a manner that the outflowing foamable reaction mixture is not uniformly distributed over the entire width of an area which is to be covered.

In the method according to the invention, the outlet lines are preferably fastened onto the frame in such a manner that the outflowing foamable reaction mixture is discharged onto a lower facing in a conveying direction of a reaction belt.

In the method according to the invention, the outlet lines are preferably fastened onto the frame in such a manner that the outflowing foamable reaction mixture is discharged onto a lower facing contrary to a conveying direction of a reaction belt.

In a third embodiment, the object of the invention is achieved by a device for producing sandwich composite elements comprising at least two feed devices for in each case an upper and a lower facing, a revolving upper belt for guiding the upper facing and a revolving lower belt for guiding the lower facing, on which are arranged in succession a high pressure device according to the invention, a shaping section and a cutting device.

In a fourth embodiment, the object of the invention is achieved by a method for producing foamed sandwich composite elements, wherein a device according to the invention is used for producing sandwich composite elements.

In the high pressure device according to the invention, a mixing head is likewise fitted on a rigid frame above the lower facing, such that different reaction profiles for producing different product thicknesses are possible. A distributor head is fastened to the mixing head, in which the individual foaming components are mixed together. This distributor head has for example at least 3, and at most 8, outlet lines, the length, cross-section and material of which are preferably all identical. This has the advantage that the foaming behaviour of the still liquid reaction mixture on coming into contact with the lower facing has progressed to the same extent at each point of contact, so leading to particularly uniform foaming of the resultant product. This advantage is promoted not only by the identical length, cross-section and material of the outlet lines, but also by the fact that the entire mixture to be applied emerges from one and the same mixing head. Any material known to a person skilled in the art which does not react with the reaction mixture to be foamed and to which the reaction mixture does not adhere unusually strongly may be used as the outlet line. The material of the outlet line is preferably selected from the group comprising steel, aluminium, stainless steel, polyethylene (PE), polypropylene (PP), polyvinyl chloride (PVC), polyethylene terephthalate (PET), rubber, polytetrafluoroethylene (PTFE) and polyurethane (PU). Rubber should be taken to mean any flexible rubber known to a person skilled in the art which can be processed to form feed lines, nitrile-butadiene rubber (NBR) being preferred. A flexible material selected from the group comprising PE, PP, PET and PVC is particularly preferred. The outlet lines are arranged and fixed on a rigid frame arranged in a transverse direction to the conveying direction of the conveyor belt over the upper facing in such a manner that they are adapted to the panel geometry and uniform application over the width of the lower facing is ensured. The outlet lines are advantageously arranged over the lower facing such that the reaction mixture is applied onto the lower facing and that the unwetted areas between the individual application zones on the lower facing are of identical size. The gaps are filled in during in-situ foaming, such that uniform in-situ foaming of the composite elements is ensured. The outlet lines are displaceable on the rigid frame in the transverse direction relative to the conveying direction of the conveyor belt for fine adjustment purposes. The rigid frame is likewise also displaceable in height. The outlet lines are moreover fitted to the frame such that the reaction mixture comes into contact with the lower facing either in or contrary to the conveying direction of the conveyor belt. Whether the reaction mixture comes into contact with the lower facing in or contrary to the conveying direction of the conveyor belt is dependent on the discharge speed from the outlet lines and on the conveying speed of the conveyor belt and optionally on the viscosity of the reaction mixture. At a discharge speed of 1.2 to 2 m/min and a conveying speed of 20 to 60 m/min, it is advantageous for application of the reaction mixture to proceed contrary to the conveying direction. At a discharge speed of 1.2 to 2 m/min and a conveying speed of up to 20 m/min, application in the conveying direction of the conveyor belt is advantageous.

Opposing application is preferred with small discharge quantities and elevated production speeds. The relative speed of the mixture to the facing is higher with opposing application and results in somewhat wider application of the individual strands.

In one particular embodiment, both the mixing head and the distributor head together with the outlet lines may be arranged and fixed such that it is also possible to produce products with a thickness which declines in the transverse direction relative to the conveying direction of the conveyor belt or with constantly changing thickness ratios, wherein the unwetted areas between the individual application zones on the lower facing may be of a linearly decreasing or ever differing size. These gaps are filled in during in-situ foaming, so enabling in-situ foaming which is desirably irregular in terms of product height.

Thanks to this type of arrangement, it is possible to dispense with a gantry, as is absolutely essential in the case of an oscillating casting rake or tongue/spoon nozzle. Moreover, with this arrangement, production speeds are solely dependent on the speed of the conveyor belt or on the discharge capacity of the foaming machine. Speeds of greater than 60 m/min may be achieved with this arrangement. A further advantage of this device according to the invention in comparison with methods which have to make use of a plurality of mixing heads is that, because only one mixing head is used, no fluctuations due to different processing pressures, temperatures or the like, with an associated reduction in production reliability and product quality, can occur.

Any mixing heads known in the prior art may be used as the mixing head for the device according to the invention. Such heads must, however, be suitable for foaming in particular of a polyol component and an isocyanate component for producing polyurethane sandwich composite elements. The chemically inert gas may be mixed into the reaction mixture in the mixing head or beforehand into one or both of the reaction components in order to prevent possible clogging of the outlet lines. The chemically inert gas is selected from the group of nitrogen, air, carbon dioxide and noble gases such as argon and helium. Instead of a gas, other constituents may also be mixed with the reaction components. These substances are, for example, selected from the group of graphite, polyurethane flour, melamine, silica sand, $Al_2O_3$, talcum and nanocomposites such as for example phyllosilicates, nanotubes, nanosand and are in particular added to the reaction components in the mixing head.

The material of the distributor head may be selected from steel, stainless steel, aluminium and plastics. In any event, the selected material must withstand the pressures and temperatures prevailing in the mixing head in the range of at most 320 bar and 20 to 40° C.

The geometry of the distributor head is preferably selected such that the passage from the distributor inlet to the respective outlets to the outlet lines is of identical length. It is furthermore advantageous for the cross-section of the distributor head outlets to be identical for all the distributor head outlets. The cross-section of the distributor head inlet, on the other hand, may also be larger than the respective distributor head outlets.

The application device according to the invention may be part of a further device which is used for producing sandwich composite elements. Polyurethane sandwich elements (panels) are generally produced in a continuous process. The panels are here continuously produced on "twin" conveyor belts in thicknesses of generally approx. 20 to 240 mm Thicknesses of below 20 mm and above 240 mm are, however, likewise possible. Such a twin conveyor belt here conventionally consists of a rotating upper belt for guiding the upper facing, a rotating lower belt for guiding the lower facing, a feed means for the upper facing, a feed means for the lower facing, a shaping section, within which the polyurethane reaction mixture foams and reacts to completion between the upper facing and the lower facing, a cutting means for the produced panel and a metering station with a mixing head for applying the polyurethane reaction mixture onto the lower facing.

The arrangement of the individual elements for a continuous production process for sandwich composite elements is known from the prior art, as described in DE 1 247 612 A1 and DE 1 609 668 A1.

For the purposes of the present invention, a sandwich composite element is understood to mean a composite element composed of at least two facings and a core layer located therebetween.

Any materials known to a person skilled in the art may be used as the core layer. Fibre boards of mineral fibres or boards of rigid foam, such as for example polyurethane or rigid polyisocyanurate (PIR) foam, polystyrene foam, phenolic resin foam, are preferred.

Specifically, sandwich composite elements consist of at least two facings of rigid or flexible material and a core layer of a foam such as for example a rigid PU foam. Rigid PU foams should here be taken to mean those rigid foams which are based on polyurethane, polyurea and polyisocyanurate compounds.

Rigid foams based on polyurethane and/or polyisocyanurate are preferably selected as the core layer. Rigid foams comprising polyurethane and/or polyisocyanurate groups may be produced by using as starting components any compounds known to a person skilled in the art with OH-compound-reactive compounds containing NCO, such as a) aliphatic, cycloaliphatic, araliphatic, aromatic and heterocyclic polyisocyanates, preferably diphenylmethane diisocyanate (MDI) or polyphenylpolymethylene polyisocyanates, polyisocyanates comprising carbodiimide groups, urethane groups, allophanate groups, isocyanurate groups, urea groups or biuret groups, particularly preferably based on polyphenylpolymethylene polyisocyanate and b) compounds with at least two isocyanate-reactive hydrogen atoms with a molecular weight in the range from 400 to 10,000 g/mol, such as for example compounds comprising amino groups, thiol groups, hydroxyl groups or carboxyl groups. It is furthermore possible to use suitable NCO prepolymers, produced from the reaction of polymeric MDI with aliphatic or aromatic polyether polyols or polyester polyols, for example polyether polyols or polyester polyols comprising 1 to 4 hydroxyl groups with a number average molecular weight of 60 to 4000.

The foams are produced using conventional auxiliary substances and additives known to a person skilled in the art, such as catalysts, blowing agents, crosslinking agents, flame retardants, foam stabilisers, flow promoters, inhibitors, and optionally solid additives for improving thermal conductivity and flame retardancy.

Any materials known to a person skilled in the art may be used as materials for the facings. Preferred materials are metals such as steel (galvanised and/or coated), aluminium (coated and/or anodised), copper, stainless steel or non-metals such as reinforced, unreinforced and/or filled plastics, such as for example polyvinyl chloride or polyester-based or glass fibres, impregnated paperboard, paper, wood, bitumen glass nonwoven and mineral glass nonwoven.

The facings may, for example, be coated with a coating material.

Combinations of the facings from the above-stated materials on the respective sides of the resultant panels are also suitable as facings.

Such composite elements based on different facings (rigid or flexible) and a core layer of rigid polyurethane foam are sufficiently well known from the prior art and are also known as metal composite elements or insulation panels. Further layers may be provided between the core layer and the facings.

Examples of the use of such composite elements with rigid facings are planar or lined wall elements and profiled roof elements for industrial building and cold store construction. The composite elements may also be used as truck bodies, large building doors and gates and in container construction. Insulation panels and composite elements with flexible facings are used as insulating materials in roofs, external walls and as flooring sheets.

Production of these composite elements using a continuous or discontinuous process is sufficiently well known from the prior art. To this end, the still liquid reaction mixture is applied onto the lower facing by means of the high pressure device according to the invention. The now slowly foaming reaction mixture on the lower facing is conveyed by means of a lower belt into the shaping section, which is defined by an upper and a lower belt. The foaming reaction mixture reaches the upper facing and so adhesively bonds the two facings together. Within the shaping section, in which the upper and the lower belt predetermine the thickness of the product to be produced, the foam solidifies and, after passing through the shaping section, is cut by a cutting device for cutting the resultant panels into desired lengths.

The invention is illustrated in greater detail below with reference to the attached drawings.

FIG. 1 shows an application device according to the invention during application of a still liquid reaction mixture 14 onto a lower facing 13. The application device comprises a mixing head 11 which is arranged above the lower facing 13. The product nozzles 7 serve to introduce the components supplied through the product lines 8 for the polyol and 9 for the isocyanate into the mixing head 11. Following the mixing head 11 there is a distributor head 12, to which are fastened six equally long outlet lines 17 made of identical material and of identical diameter. The outlet lines 17 are fastened over the entire width of the lower facing 13 on the underside of the frame 16 which extends transversely of the conveying direction such that uniform application onto the facing 13 may proceed in the conveying direction of the conveyor belt. The frame 16 is arranged rigidly above the lower facing 13. The positioning of the outlet lines 17 on the frame 16 may vary transversely of the conveying direction for fine adjustment purposes (not shown). The inert gas (for example air) is compressed to a pressure of for example 180 bar by the compressor 1. Regulation to a lower pressure, for example 150 bar, may then proceed by means of the reducing regulator 2. In the embodiment shown, the measurement/control means 4, the on/off valve 3, the nonreturn valve 5 and the static mixer 6 are fastened to the second frame component 10 (also denoted gantry). The embodiment shown in FIG. 1 provides an arrangement adapted to the panel geometry of the outlet lines 17 on the frame 16, which arrangement ensures that the still liquid reaction mixture 14 comes into contact with the lower facing 13 in such a manner that the uncovered areas 15 of the lower facing 13 between the covered areas are identical in size, in order to ensure uniform foaming over the entire width of the facing 13. In this manner, the gaps 15 are uniformly closed during subsequent foaming of the liquid reaction mixture 14. In a further embodiment, the outlet lines 17 may also be fitted to the frame 16 such that the reaction mixture may be applied onto the lower facing 13 contrary to the conveying direction of the conveyor belt. In a further embodiment, the outlet lines 17 may also be arranged on the frame 16 such that the thickness of the particular foam produced varies transversely of the conveying direction of the conveyor belt.

Figure 2:
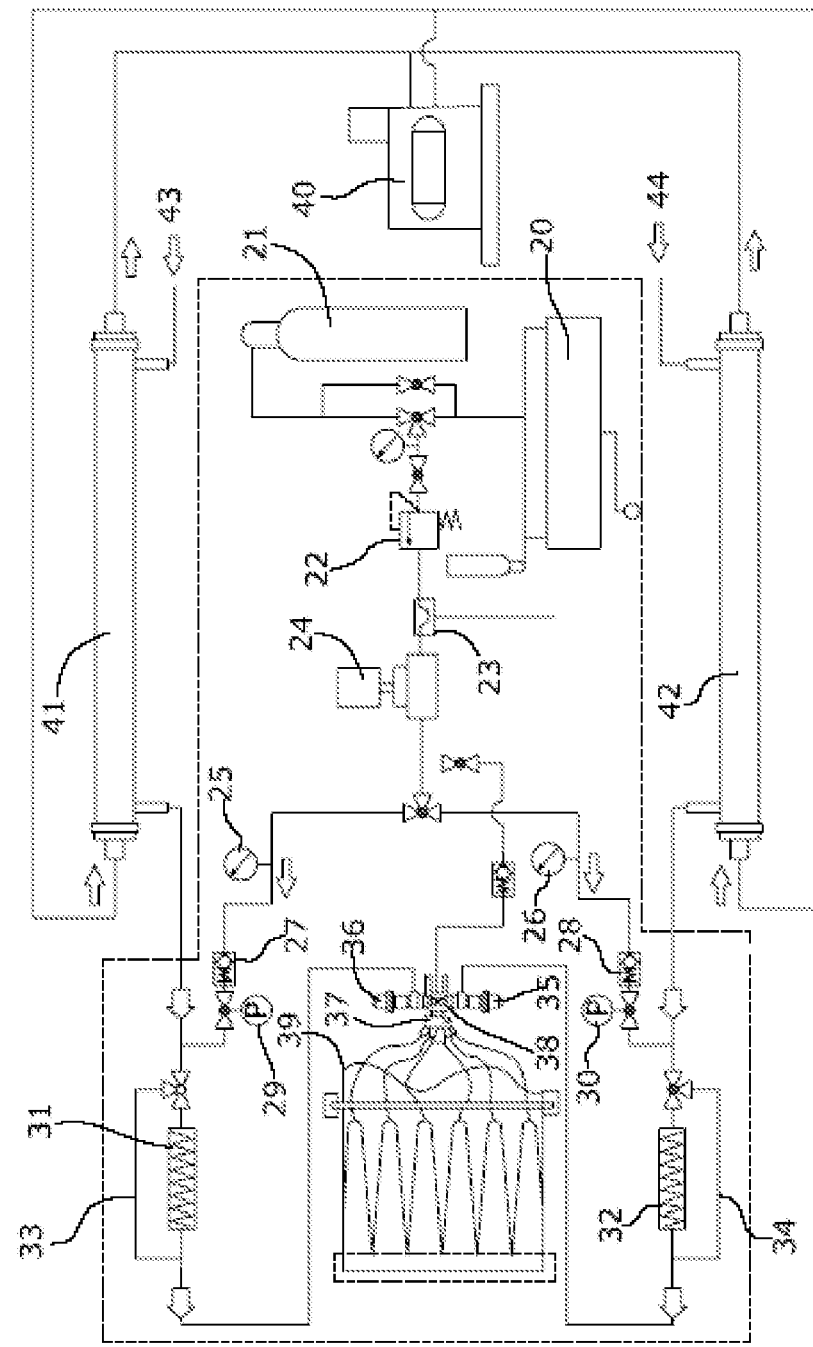
FIG. 2 is a schematic illustration of an application device according to an embodiment of the present invention.

FIG. 2 shows a more detailed plan of an embodiment according to the present invention. The components entering at 43 and 44 are firstly precooled by the high-pressure heat exchangers 41 and 42 respectively. In addition to the high-pressure heat exchangers 41 and 42, the cooling (agent) circuit also comprises a refrigeration unit 40. The two components then enter the static mixers 31 and 32, which are in each case provided with bypasses 33 and 34, in order to be mixed therein with the inert gas under elevated pressure. They are introduced into the mixing head 38 via the product nozzles 35 and 36. The resultant mixture, i.e. the foaming foam, then flows through the distributor head 37 and six outlet orifices for application onto the lower facing 39. The compressed inert gas is provided either by the compressor 20 and/or by the gas cylinder(s) 21. Where necessary, the reducing regulator 22 reduces the pressure to values acceptable to the high pressure device. A bursting disk 23 is provided for emergency situations in order to avoid damage to components arranged flow-wise downstream. The quantity of the inert gas which is introduced into the stream of components is ultimately controlled by the measurement unit 24, the manometers 25 and 26, the nonreturn valves 27 and 28 and the nonreturn valves 29 and 30.

The invention claimed is:

1. A method for applying a foamable reaction mixture to a substrate comprising:
   a) combining components A and B with an inert gas in a mixing head to form a foamable reaction mixture,
   b) discharging the foamable reaction mixture to a distributor head,
   c) discharging the foamable reaction mixture from the distributor head through outlet lines attached to that distributor head to the substrate utilizing a device comprising:
      1) a mixing head in which components of the foamable reaction mixture are combined,
      2) a distributor head located flow-wise downstream of the mixing head,
      3) at least three outlet lines fitted to the distributor head through which the foamable reaction mixture flows and is discharged onto the substrate,
      4) a first feed line through which a component A is introduced into the mixing head,
      5) a second feed line through which a component B is introduced into the mixing head,
      6) at least one static mixer for intermixing an inert gas with component A, component B or a mixture of components A and B prior to entry of component A and/or component B into the mixing head,
      7) at least one feed line under elevated pressure for the inert gas, the gas being compressed to a pressure of >150 bar prior to introduction into component A, component B and/or the mixture of components A and B, and the feed line being positioned before the static mixer and flow-wise upstream of the mixing head and
      8) at least one measurement and control unit for establishing the pressures of each components at the mixing head.

2. The method of claim 1 in which an isocyanate component is used as component A.

3. The method of claim 2 in which a polyol component is used as component B.

4. The method of claim 1 in which the outlet lines are fastened onto a frame in such a manner that any areas of the substrate not wetted by the discharged foamable reaction mixture are identical in size to an area of the substrate which is to be covered.

5. The method of claim 1 in which the outlet lines are fastened onto a frame in such a manner that the discharged foamable reaction mixture is not uniformly distributed over the entire width of an area of the substrate which is to be covered.

6. The method of claim 1 in which the outlet lines are fastened onto a frame in such a manner that the discharged foamable reaction mixture is discharged onto a lower facing in a conveying direction of a reaction belt.

7. The method of claim 1 in which the outlet lines are fastened onto a frame in such a manner that the discharged foamable reaction mixture is discharged onto a lower facing contrary to a conveying direction of a reaction belt.

8. The method of claim 1 in which a polyol component is used as component B.

9. A method for applying a foamable reaction mixture to a substrate comprising:
   a) feeding component A through a first feed line through which component A is introduced into a mixing head,
   b) feeding component B through a second feed line through which component B is introduced into the mixing head,
   c) compressing an inert gas to a pressure of >150 bar in at least one feed line prior to step d), the feed line being positioned before the static mixer and flow-wise upstream of the mixing head,
   d) intermixing the inert gas with component A, component B or a mixture of components A and B with a static mixer prior to entry of component A and/or component B into the mixing head,
   e) combining components A and B with an inert gas in the mixing head to form a foamable reaction mixture, wherein the pressure of each component at the mixing head is established with at least one measurement and control unit,
   f) discharging the foamable reaction mixture to a distributor head located flow-wise downstream of the mixing head, and
   g) discharging the foamable reaction mixture from the distributor head through at least three outlet lines fitted to the distributor head and onto the substrate.

10. The method of claim 9 in which an isocyanate component s used as component A.

11. The method of claim 10 in which a polyol component is used as component B.

12. The method of claim 9, further comprising fastening the outlet lines onto a frame in such a manner that any areas of the substrate not wetted by the discharged foamable reaction mixture are identical in size to an area of the substrate which is to be covered.

13. The method of claim 9, further comprising fastening the outlet lines onto a frame in such a manner that the discharged foamable reaction mixture is not uniformly distributed over the entire width of an area of the substrate which is to be covered.

14. The method of claim 9, further comprising fastening the outlet lines onto a frame in such a manner that the discharged foamable reaction mixture is discharged onto a lower facing in a conveying direction of a reaction belt.

15. The method of claim 9, further comprising fastening the outlet lines are fastened onto a frame in such a manner that the discharged foamable reaction mixture is discharged onto a lower facing contrary to a conveying direction of a reaction belt.

* * * * *